Patented Oct. 11, 1927.

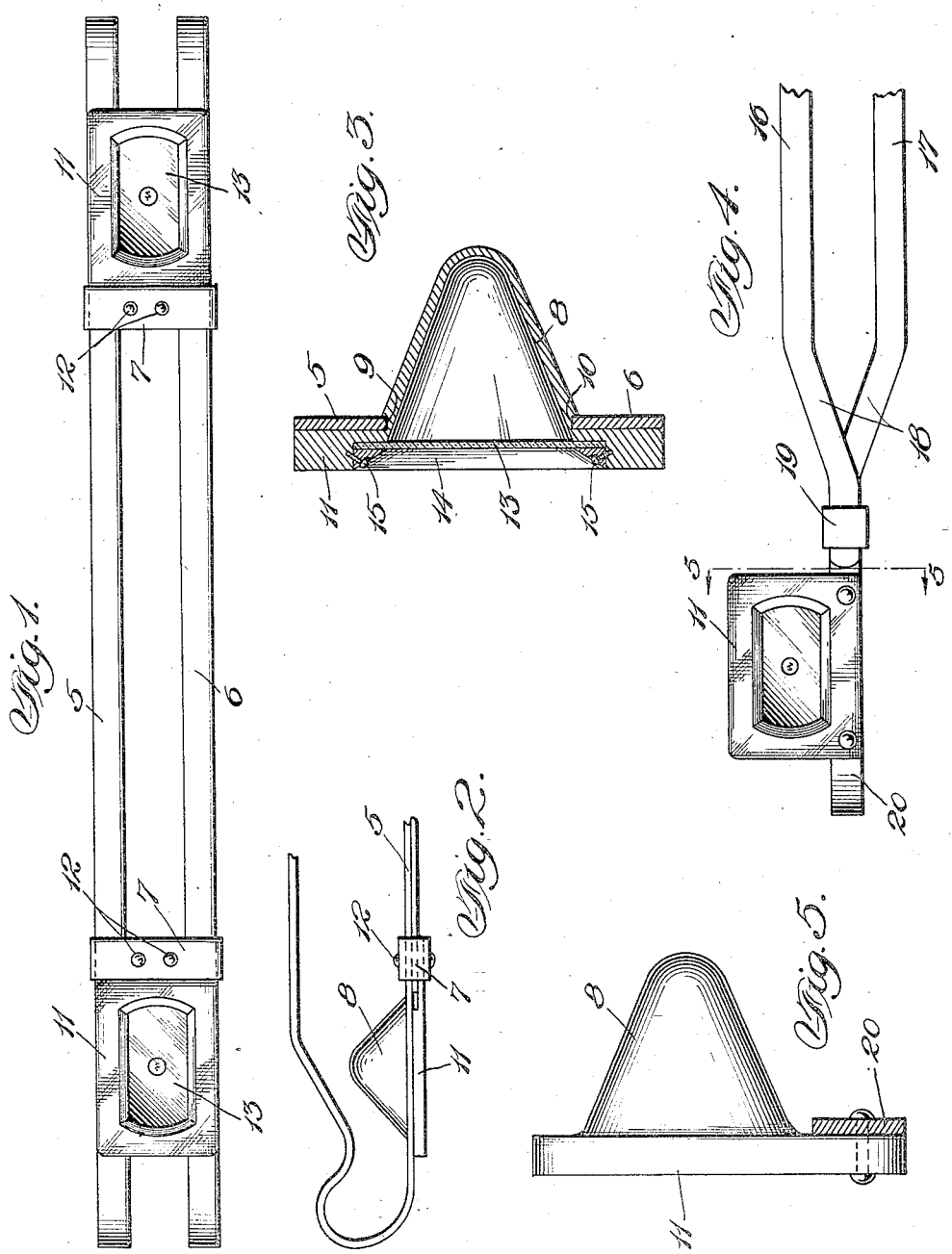

1,644,945

UNITED STATES PATENT OFFICE.

ALBERT W. PATTISON, OF LOCKPORT, NEW YORK.

HEADLIGHT FOR SPRING BUMPERS.

Application filed October 9, 1925. Serial No. 61,489.

This invention relates to a combined bumper and roadlight construction and the object of the invention is to provide roadlights of novel construction adapted to be applied to and carried by standard bumpers of the conventional flat type.

Other purposes and advantages of the invention will be more readily understood from the following description and accompanying drawings in which, Figure 1 is a front elevation of a combined bumper and roadlight constructed in accordance with my invention.

Figure 2 is a fragmentary top plan view of the construction shown in Figure 1.

Figure 3 is a transverse sectional view through one of the roadlights showing the manner in which it is inserted between the upper and lower impact bars of the bumper.

Figure 4 is a fragmentary front elevational view of a modified construction and, Figure 5 is a sectional view taken along line 5—5 of Figure 4.

Referring more particularly to the drawings, the bumper shown in Figure 1 is of conventional design consisting of the vertically spaced flat impact bars 5 and 6 and the connecting bands 7 joining the front portions of the bars. In adapting my invention to a bumper of this type I provide a pair of lamps presenting body portions 8 adapted to be inserted between the spaced front portions of the bars 5 and 6 as shown to advantage in Figures 1 and 3 and formed with upper and lower grooves 9 and 10 receiving the opposing edges of the bars therein. At its front each lamp body 8 is formed with an outwardly directed continuous flange 11 having the top and bottom portions thereof lying against the front faces of the bars 5 and 6. The inner end portion of each flange is inserted between the said front faces of the bars 5 and 6 and the adjacent band 7 and is secured to the latter by the rivets 12 whereby said lamp bodies are anchored in place.

At the front each lamp body 8 is closed by a lens 13 seated in a recess formed at the inner edge of the flange 11 and held in said recess by a suitable retaining frame 14 fastened to the flange as indicated at 15.

In Figure 4 I have shown a modified form of bumper which is also of conventional design including upper and lower bars 16 and 17 having their ends converging as indicated at 18 and secured together by a suitable band or other means 19. According to usual practice one of these bars is made longer than the other so that the extremities thereof project beyond corresponding extremities of the other bar to provide extensions 20. In applying my improved roadlights to a bumper of this type it is simply necessary to rivet or otherwise secure the lower portion of the flange 11 to the front of the extension 20 as shown to advantage in Figures 4 and 5 with the body portion 8 of the lamp extending rearwardly. It will be understood however that if it is desired to dispose the roadlights in a lower plane than that shown in Figure 4 this may be accomplished by securing the upper portion of the flange 11 to the extension 20 with the body 8 of the lamp positioned below said extension.

Having thus fully described what I now consider to be the preferred embodiments of my invention it will be understood that various changes may be resorted to within the scope and spirit of the appended claims.

I claim:

1. A combined bumper and roadlight comprising vertically spaced impact members and a lamp body secured between said members and provided with upper and lower grooves receiving portions of the members therein.

2. A combined bumper and roadlight structure comprising a pair of vertically spaced, flat, impact bars suitably connected together, a pair of lamp bodies inserted between the spaced front portions of said bars and formed with upper and lower grooves receiving the opposing edges of the bars therein and a continuous flange formed at the front of each lamp body and having its upper and lower portions lying in contact with the front faces of said bars.

3. A combined bumper and roadlight structure comprising a pair of vertically spaced, flat, impact bars, connecting bands joining the front portions of said bars, a pair of lamp bodies inserted between the spaced front portions of the bars and formed with upper and lower grooves receiving the opposing edges of the bars therein, each of said lamp bodies being formed with an outwardly directed continuous flange having the top and bottom portions thereof lying against the front faces of said bars and the inner end portion thereof interposed between the bars and the adjacent connecting band and fastened to the latter.

4. A combined bumper and roadlight structure comprising vertically spaced, flat, impact bars, connecting bands joining the front portions of the bars and lamp bodies equipped with flanges interposed between opposing surfaces of the bars and connecting bands and secured to the latter.

5. A combined bumper and roadlight structure comprising vertically spaced impact members, a lamp body inserted between the opposing edges of said members and provided at the front with a continuous laterally projecting flange engaging the front portions of said members and means including fastening devices passing through said flange for securing the lamp body to said members.

In testimony whereof I hereunto affix my signature.

ALBERT W. PATTISON.